United States Patent
Kale et al.

(10) Patent No.: US 9,597,713 B2
(45) Date of Patent: Mar. 21, 2017

(54) COTTON FEEDING UNIT

(71) Applicant: YIGITLER TEKSTIL INSAAT VE TURIZM A.S., Istanbul (TR)

(72) Inventors: Engin Kale, Istanbul (TR); Ismail Faruk Kuyumcu, Istanbul (TR)

(73) Assignee: Yiğitler Tekstil Sanayi ve Ticaret Anonim Sirketi, Istanbul (TR)

( * ) Notice: Subject to any disclaimer, the term of this patent is extended or adjusted under 35 U.S.C. 154(b) by 0 days.

(21) Appl. No.: 14/436,368

(22) PCT Filed: Nov. 15, 2013

(86) PCT No.: PCT/TR2013/000345
§ 371 (c)(1),
(2) Date: Apr. 16, 2015

(87) PCT Pub. No.: WO2015/072935
PCT Pub. Date: May 21, 2015

(65) Prior Publication Data
US 2016/0023247 A1 Jan. 28, 2016

(51) Int. Cl.
*B07B 9/00* (2006.01)
*B65G 53/24* (2006.01)
(Continued)

(52) U.S. Cl.
CPC .............. *B07B 9/00* (2013.01); *B65G 53/24* (2013.01); *B65G 53/42* (2013.01); *B65G 53/60* (2013.01); *B65G 53/62* (2013.01)

(58) Field of Classification Search
CPC ........ B65G 53/24; B65G 53/42; B65G 53/60; B65G 53/62; B07B 9/00
(Continued)

(56) References Cited

U.S. PATENT DOCUMENTS

| 304,982 A | 9/1884 | Wiesebrock |
| 560,914 A | 5/1896 | Murray |

(Continued)

FOREIGN PATENT DOCUMENTS

| DE | 32 23 073 A1 | 3/1984 |
| JP | S58-109331 A | 6/1983 |

(Continued)

OTHER PUBLICATIONS

Aug. 28, 2014 International Search Report issued in International Application No. PCT/TR2013/000345.
(Continued)

*Primary Examiner* — Terrell Matthews
(74) *Attorney, Agent, or Firm* — Oliff PLC

(57) ABSTRACT

A cotton feeding unit has a radial type aspirator; primary cotton filter that enables cotton suction; secondary cotton filter that captivates dust; linear motion chassis of primary and secondary filters that carries cyclones and allows linear motion; primary filter rotary valve that enables cotton to land on transfer conveyor; horizontal cotton transfer conveyor that transfers landed cotton; air box that screens the warehouse with flexible hose mobile crane and connects hose and suction nozzle with air box; cotton fine dust bag filter that captures particles; cotton suction venturi nozzle mobile collection arm that unlooses hardened cotton; secondary filter butterfly valve that discharges contaminated water containing dust from cyclone to filter cabin; secondary filter cake cabin that collects accumulated amount discharged from cyclone; secondary filter atmosphere exit bag filter dust collection cabin which collects particles held by cotton fine dust bag; tremie intake-storage filling rotary flap that enables delivery of cotton.

13 Claims, 1 Drawing Sheet

(51) Int. Cl.
*B65G 53/42* (2006.01)
*B65G 53/60* (2006.01)
*B65G 53/62* (2006.01)

(58) Field of Classification Search
USPC .......................................................... 209/23
See application file for complete search history.

(56) References Cited

U.S. PATENT DOCUMENTS

| | | | | |
|---|---|---|---|---|
| 2,446,573 | A * | 8/1948 | Cameron | B65G 53/42 406/152 |
| 2,708,603 | A * | 5/1955 | Yost | B65G 53/60 406/23 |
| 2,830,674 | A | 4/1958 | Dolf et al. | |
| 3,236,565 | A * | 2/1966 | Kester | B65G 69/186 406/121 |
| 3,298,747 | A * | 1/1967 | Beckett | B65G 53/42 406/152 |
| 3,874,860 | A * | 4/1975 | Larsson | B65G 53/62 209/10 |
| 4,305,620 | A | 12/1981 | Hart | |
| 4,436,457 | A * | 3/1984 | Willingham | B65G 53/52 406/116 |
| 4,470,729 | A * | 9/1984 | Fredenburg | B65G 53/52 406/116 |
| 5,117,533 | A * | 6/1992 | Stuller | D01B 1/04 15/414 |
| 5,542,790 | A * | 8/1996 | Stuller | D01B 1/04 406/116 |
| 6,807,750 | B1 * | 10/2004 | Lewis | F26B 17/101 19/66 CC |
| 7,785,044 | B2 * | 8/2010 | Sundholm | B01D 47/06 406/153 |
| 8,046,877 | B2 * | 11/2011 | Nimmo | A01D 46/08 19/48 R |
| 2016/0023247 | A1 * | 1/2016 | Kale | B65G 53/24 209/23 |

FOREIGN PATENT DOCUMENTS

| | | |
|---|---|---|
| JP | S58-113038 A | 7/1983 |
| JP | 2011-079611 A | 4/2011 |
| WO | 2007/051466 A1 | 5/2007 |
| WO | 2007/065966 A1 | 6/2007 |

OTHER PUBLICATIONS

Aug. 28, 2014 Written Opinion of the International Searching Authority issued in International Application No. PCT/TR2013/000345.

* cited by examiner

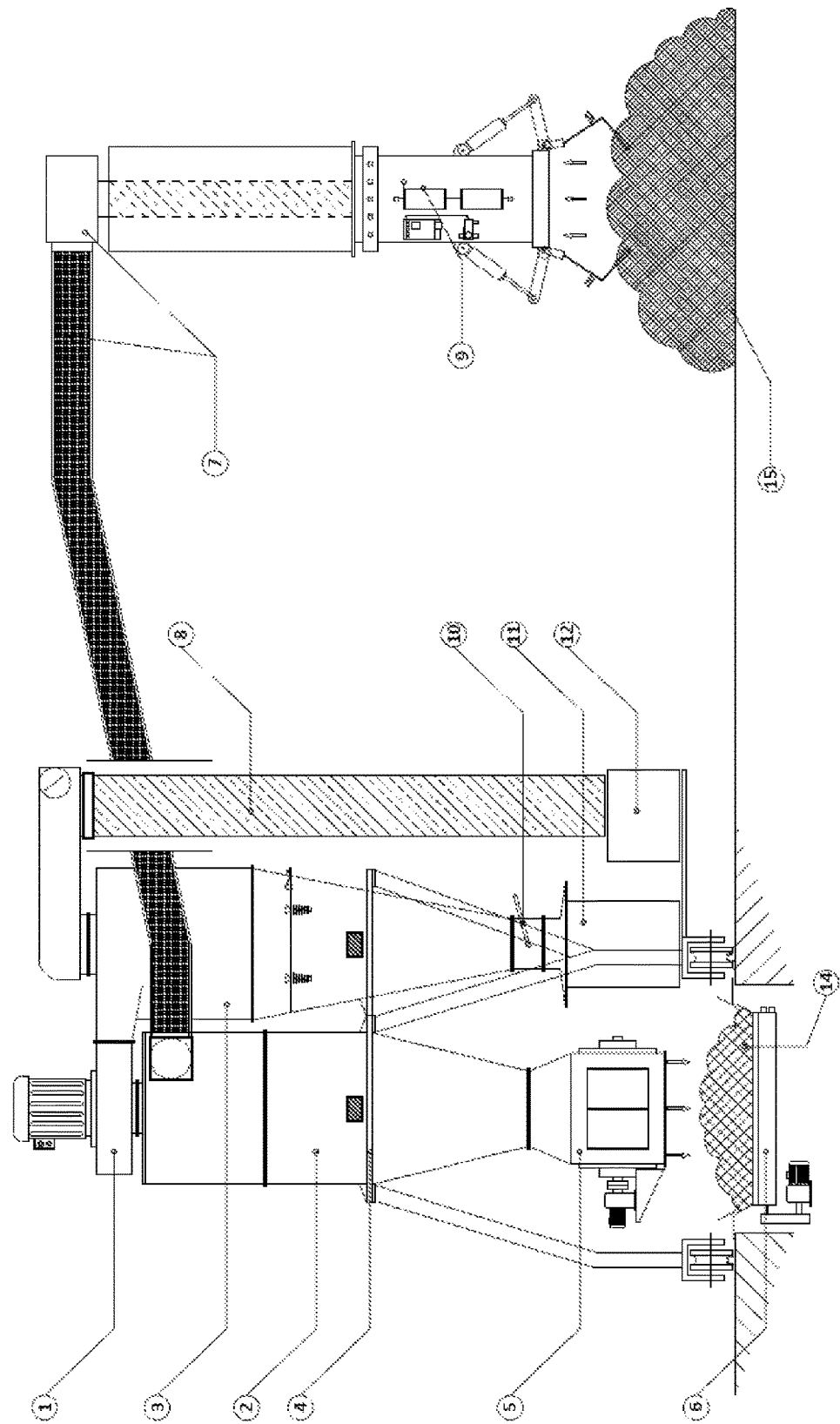

COTTON FEEDING UNIT

This invention is about cotton feeding unit that transfers raw cotton piles—without giving any harm to cotton—at cotton gin factories from one place to another by a telescopic suction pipe, which is placed on the mobile crane and can lengthen and shorten and separates foreign bodies like dust, soil and stone from raw cotton during transfer.

Today, several methods are employed at cotton gin factories to transfer raw cotton piles. One of these methods is to transfer raw cotton pile by carrying it under the fixed telescope system. In this method, it is required to loose cotton pile and push other cotton piles under the telescopic system with the help of work force when there is no more cotton pile under the fixed telescopic suction pipe. This method is exhaustive for the workers and inefficient for the business due to being a slow process. Additionally, there is high level of dust in the cotton pile, coming directly from the field without any cleaning process. Respiratory systems, eyes and skins of the workers working with these cotton piles are also negatively affected as they are directly exposed to harmful dust in the cotton piles.

One of the disadvantages of cotton transfer system with fixed telescope is that an ignition may occur as a result of the contact of iron hand tools used by workers to take the cotton pile to front of suction pipe with concrete etc. grounds and by inflammable materials such as matches, cigarettes etc. that escape to the suction pipe due to the negligent acts of workers carrying cotton piles under the telescopic suction pipe and this may spread resulting in serious harm to the system.

Living seed in the cotton pile is fermented when waited without processing and passes to oil cotton fiber in the cotton. The spoiled cotton batches that have become unusable incur economical losses to the business firm. For this reason, transfer works should be done with modern methods in a short time to allow raw cotton to be processed as soon as possible.

Another disadvantage of the cotton transfer system with fixed telescope is that it causes storage problems for the cotton coming from the fields at the same time. Due to the fixed height of the suction pipe, the height of raw cotton piles is restricted and low. Restricted height of the cotton piles prevents the practical use of storage area and creates need for bigger areas for cotton pile storage. Due to the fixed height of the telescopic suction pipe, efficacy of it varies constantly depending upon the height of cotton pile. As the height of the absorbed raw cotton pile decreases, productivity declines and workers have to control the height of the cotton pile and increase it constantly.

Another disadvantage of the cotton transfer system with fixed telescope is that the holes of the perforated sheet that is used as a separator in the suction system to separate raw cotton from the air enabling cotton transfer are blocked in time and fail to enable sufficient cotton suction and it works inefficiently sending the dust in the cotton to the facility. The dust sent to the facility affects the health of employees negatively. Although it is possible to eliminate these problems by disassembling and cleaning the separator sheet this process causes labor and production losses for the business.

In the present technique, there is a need for a cotton feeding unit that operates with high efficiency, enables efficient use of cotton storages by allowing cotton piles to be piled up to 7 meter, prevents any harm from stone or metal particles in the cotton pile to the machine by capturing them with its electronic system, enables fast transfer of cotton from a place to the another without causing harm to the cotton with its telescopic suction pipe that can lengthen and shorten on the mobile crane.

This invention which is about cotton feeding unit that transfers raw cotton piles—without giving any harm to cotton—at cotton gin factories from one place to another by a telescopic suction pipe which is placed on the mobile crane and can lengthen and shorten and separates foreign bodies like dust, soil and stone from raw cotton during transfer, eliminates above mentioned disadvantages completely and is characterized by a telescopic suction pipe which can lengthen and shorten and is placed on a mobile crane that can reach every point of the site with remote control by an operator, allowing quick transfer of raw cotton from one place to another.

Another advantage of the invention is that the transfer process can be quickened by attaching a belt conveyor to the system.

Another advantage of the invention is that, it reduces the risk of fire by preventing ignition that may be caused by the contact of iron hand tools used by workers to take the cotton pile to front of suction pipe with concrete etc. grounds and by inflammable materials such as matches, cigarettes etc. that escape to the suction pipe due to the negligent acts of workers because it does not require work force to transfer cotton piles.

Another advantage of the invention is that it prevents dust and agricultural pesticide in the cotton piles to harm the health of employees during transfer as it invalidates the practice of transfer by workers.

Another advantage of the invention is that it prevents any damage by stone and metal particles in the cotton piles to the machines by capturing them with its electronic system.

Another advantage of the invention is that because its mobile telescopic suction pipe is capable of allowing suction of great amounts of piled cotton bulks, it enables cotton storages to be used more practically with the high piled cotton piles comparing to the traditional low piled cotton piles.

Another advantage of the invention is that with the use of air locked cyclone instead of separator used in traditional methods, it eliminates disadvantages that arise when the separator sheet holes are blocked by cotton fibers and as a result, the dust in the raw cotton is sent to the facility.

Another advantage of the invention is that its mobile telescope eliminates problems arising from operator mistakes by adjusting the most efficient suction distance automatically according to the height of cotton pile and enables cotton feeding unit to operate with high efficiency all the time.

Another advantage of the invention is that it can also be used in facilities called "gin" that operates to remove foreign bodies from the raw cotton and separate cotton fiber from its seed and in intermediate stations such as batch places that the raw material should be transferred to.

This invention is described in more details through illustrations only by referring to the below FIGURES; in these FIGURES;

FIG. 1. Schematic view of the cotton feeding unit.

REFERENCES

| NO | PART DESIGNATION |
|---|---|
| 1 | Radial Type Aspirator (Cotton Transfer Aspirator) |
| 2 | Primary Cotton Filter (Dust Cyclone) |

-continued

| NO | PART DESIGNATION |
|---|---|
| 3 | Secondary Cotton Filter (Water Cyclone) |
| 4 | Linear Motion Chassis of Primary and Secondary Filters |
| 5 | Primary Filter Rotary Valve (Air Lock) |
| 6 | Horizontal Cotton Transfer Conveyor |
| 7 | Air Box with Fixed Mobile Crane and Flexible Hose |
| 8 | Cotton Fine Dust Bag Filter |
| 9 | Cotton Suction Venturi Nozzle Mobile Collection Arm |
| 10 | Secondary Filter Butterfly Valve |
| 11 | Secondary Filter Cake Cabin |
| 12 | Secondary Filter Atmosphere Exit Bag Filter Dust Collection Cabin (with drawers) |
| 13 | Tremie Intake - Storage Filling Rotary Flap |
| 14 | Transferred Cotton Cleared of Dust etc. Materials |
| 15 | Cotton Pile Coming Directly from the Field and Containing Dust etc. Materials |

This invention is about cotton feeding unit that transfers raw cotton piles—without giving any harm to cotton—at cotton gin factories from one place to another by a telescopic suction pipe which is placed on the mobile crane and can lengthen and shorten and separates foreign bodies like dust, soil and stone from raw cotton during transfer is generally characterized by a radial type aspirator (cotton transfer aspirator) (1); primary cotton filter (dust cyclone) (2) that enables cotton suction by creating a cyclone effect in the cyclone by means of aspirator; secondary cotton filter (water cyclone) (3) that captivates dust coming out of cotton suction cyclone in the water by preventing it to spread to the air; linear motion chassis of primary and secondary filters (4) that carries both cyclones and allows linear motion on the guide with the help of its wheels; primary filter rotary valve (air lock) (5) that enables cotton to land on the transfer conveyor properly by decomposing absorbed cotton and air; horizontal cotton transfer conveyor (6) that transfers landed cotton to the facility; air box with fixed mobile crane and flexible hose (7) that screens the whole warehouse with flexible hose mobile crane and connects hose and suction nozzle with air box acting like an elbow; cotton fine dust bag filter (8) that captures particles which may escape from water cyclone; cotton suction venturi nozzle mobile collection arm (9) that unlooses hardened cotton with pneumatic piston arms and makes it suitable for suction; secondary filter butterfly valve (10) that discharges contaminated water containing dust from cyclone to filter cabin; secondary filter cake cabin (11) that collects accumulated amount discharged from cyclone; secondary filter atmosphere exit bag filter dust collection cabin (with drawers) (12) which is a cabin with drawers and collects particles held by cotton fine dust bag; tremie intake-storage filling rotary flap (13) that enables delivery of cotton taken from the vehicle as needed to the warehouse or facility/business firm.

The invention claimed is:
1. A cotton feeding unit which transports the raw cotton in bulk to the ginneries from the fields without causing any damage and separates the foreign particles such as dust, soil and stones during the transport and comprises:
   a radial type aspirator which provides the absorption power used for transferring the cotton bulk which is directly received from the field and which contains foreign particles;
   a picking arm, which can move in any direction in the warehouse and which loosens up the hardened cotton through the pneumatic arms located at the edge part and prepares it for absorption;
   a primer filter (dust cyclone) which provides the separation of foreign particles from the cotton by centrifugal effect on the cotton bulk containing foreign particles during transport, and
   primary and secondary filters with linear movement chassis which enable the linear movement of the cyclones thanks to the wheels moving on a rail.
2. The cotton feeding unit as claimed in claim 1, comprising a primary filter rotary valve (air lock) which lowers the cotton onto the transport conveyor and enables the separation of the absorbed cotton and the air.
3. The cotton feeding unit as claimed in claim 1, comprising a secondary filter atmosphere outlet bag filter dust collection cabin which is the cabin with drawers where the particles held by the cotton fine dust filter are collected.
4. The cotton feeding unit as claimed in claim 1, comprising a tremie pipe with rotary valve that enables the cotton taken over the transport vehicle to be given to the warehouse or the production unit as based on the needs.
5. The cotton feeding unit as claimed in claim 1, comprising a secondary filter (wet cyclone) that prevents the spread of the dust, which was separated from the cotton in the cotton absorption canal, into the air by confining it in the water.
6. The cotton feeding unit as claimed in claim 5, comprising a cotton fine dust bag filter which holds the particles that can escape from wet cyclone.
7. The cotton feeding unit as claimed in claim 5, comprising a secondary filter butterfly valve which enables the water polluted by dust to be discharged to the filter cabin from the wet cyclone.
8. The cotton feeding unit as claimed in claim 7, comprising a secondary filter cake cabin where the deposits discharged from the cyclone by the secondary filter butterfly valve are collected.
9. A cotton feeding unit which transports the raw cotton in bulk to the ginneries from the fields without causing any damage and separates the foreign particles such as dust, soil and stones during the transport and comprises the processing steps;
   applied during the transport of the cotton bulk containing foreign particles directly received from the field such as;
   the picking arm, reaching any place of the cotton bulk by moving in any direction in the warehouse, thanks to its air box with flexible hose and mobile crane fixation;
   loosening of the hardened cotton and preparation of it for absorption through the pneumatic arms on the edge of the picking arm;
   taking the cotton bulk containing foreign particles from the picking arm with venturi type mouth, thanks to the absorption power created by the radial type aspirator;
   separating the cotton bulk containing foreign particles, which passes through the moving picking arm and the flexible hose, from the foreign particles thanks to the centrifuge created by the dust cyclone in the primary filter;
   lowering of the cotton purified of the foreign particles to the horizontal transport conveyor and sending for processing.
10. The cotton feeding unit as claimed in claim 9, wherein the processing step which confines the cotton into the water by using the secondary filter (wet cyclone), if required, which prevents the spread of the dust particles into the air.

11. The cotton feeding unit as claimed in claim 9, wherein the processing step which holds the small particles escaping from the secondary filter, in a fine dust filter and collects them in the dust collection cabin.

12. The cotton feeding unit as claimed in claim 9 wherein the air box comprises a flexible hose and mobile crane fixation which enables the moving picking arm with venturi type mouth move in any direction in the whole warehouse.

13. The cotton feeding unit as claimed in claim 9, comprising a cotton horizontal conveyor which transfers the cotton lowered onto it, to the production unit.

\* \* \* \* \*